(12) United States Patent
Liu et al.

(10) Patent No.: US 10,691,819 B2
(45) Date of Patent: Jun. 23, 2020

(54) METHOD AND APPARATUS FOR REMOTELY DELETING INFORMATION

(71) Applicant: Tencent Technology (Shenzhen) Company Limited, ShenZhen, Guangdong (CN)

(72) Inventors: Qiang Liu, Guangdong (CN); Rongjie Shao, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 127 days.

(21) Appl. No.: 15/661,858

(22) Filed: Jul. 27, 2017

(65) Prior Publication Data

US 2017/0323115 A1 Nov. 9, 2017

Related U.S. Application Data

(63) Continuation of application No. PCT/CN2016/081405, filed on May 9, 2016.

(30) Foreign Application Priority Data

Jun. 5, 2015 (CN) .......................... 2015 1 0306263

(51) Int. Cl.
*G06F 21/62* (2013.01)
*H04W 12/02* (2009.01)
(Continued)

(52) U.S. Cl.
CPC ........ *G06F 21/6218* (2013.01); *H04L 63/083* (2013.01); *H04L 63/0876* (2013.01);
(Continued)

(58) Field of Classification Search
CPC ......... G06F 21/6218; G06F 2221/2143; H04L 63/083; H04L 63/0876; H04L 67/24;
(Continued)

(56) References Cited

U.S. PATENT DOCUMENTS 7,325,052 B1 * 1/2008 Motoyama ............ G06F 21/554
709/223
8,069,143 B2 * 11/2011 Swanburg ........... H04M 7/0033
707/610
(Continued)

FOREIGN PATENT DOCUMENTS

CN 101772017 A 7/2010
CN 102196021 A 9/2011
(Continued)

OTHER PUBLICATIONS

International Search Report for International Application PCT/CN2016/081405 dated Jul. 28, 2016 in 2 pages.

*Primary Examiner* — Taghi T Arani
*Assistant Examiner* — Badri Narayanan Champakesan
(74) *Attorney, Agent, or Firm* — Anova Law Group, PLLC

(57) ABSTRACT

The present application relates to the field of communications. A method and apparatus for remotely deleting information are provided. In some embodiments, the method includes: when a user logs in to a terminal and requests enabling a remote deletion function, acquiring a permission for deleting all information; receiving an all information deletion command sent by a server after the user performs remote login; and performing, according to the command and the permission, an operation of deleting all information in the terminal. In some embodiments, the apparatus includes an acquiring module, a reception module, and a deletion module.

9 Claims, 6 Drawing Sheets

(51) Int. Cl.
*H04W 12/08* (2009.01)
*H04L 29/06* (2006.01)
*H04L 29/08* (2006.01)
*H04W 8/18* (2009.01)
*H04W 12/06* (2009.01)
*H04W 4/14* (2009.01)

(52) U.S. Cl.
CPC ............ *H04L 67/24* (2013.01); *H04L 67/306* (2013.01); *H04W 8/18* (2013.01); *H04W 12/02* (2013.01); *H04W 12/06* (2013.01); *H04W 12/08* (2013.01); *G06F 2221/2143* (2013.01); *H04W 4/14* (2013.01)

(58) Field of Classification Search
CPC ...... H04L 67/306; H04W 8/18; H04W 12/02; H04W 12/06; H04W 12/08; H04W 4/14
USPC ............................................................. 726/7
See application file for complete search history.

(56) References Cited

U.S. PATENT DOCUMENTS

| | | | | |
|---|---|---|---|---|
| 8,422,428 | B1* | 4/2013 | Hilyard | H04L 41/0654 370/328 |
| 8,467,768 | B2* | 6/2013 | Mahaffey | H04L 41/026 455/411 |
| 8,504,532 | B2* | 8/2013 | Saxena | G06F 21/62 706/12 |
| 9,760,590 | B2* | 9/2017 | Speede | H04L 51/08 |
| 2009/0320117 | A1* | 12/2009 | Liu | H04L 63/0807 726/9 |
| 2011/0191838 | A1* | 8/2011 | Yanagihara | G06F 15/16 726/7 |
| 2011/0218965 | A1* | 9/2011 | Lee | G06F 21/305 707/640 |
| 2012/0151223 | A1* | 6/2012 | Conde Marques | G06F 21/575 713/193 |
| 2012/0184248 | A1* | 7/2012 | Speede | H04W 4/14 455/411 |
| 2013/0007245 | A1* | 1/2013 | Malik | H04L 41/0816 709/223 |
| 2013/0054682 | A1* | 2/2013 | Malik | G06F 8/60 709/203 |
| 2013/0304850 | A1* | 11/2013 | Mahaffey | H04L 41/026 709/217 |
| 2014/0024348 | A1* | 1/2014 | Hurst | H04M 3/5232 455/414.1 |
| 2014/0068780 | A1* | 3/2014 | Kim | G06F 21/88 726/26 |
| 2015/0089611 | A1* | 3/2015 | Speede | H04W 12/08 726/7 |
| 2015/0180894 | A1* | 6/2015 | Sadovsky | G06F 3/0481 726/22 |
| 2015/0339497 | A1* | 11/2015 | Kurian | G06F 21/78 726/34 |
| 2016/0179624 | A1* | 6/2016 | Stuntebeck | G06F 11/00 707/653 |
| 2016/0260078 | A1* | 9/2016 | Phillips | G06Q 20/327 |

FOREIGN PATENT DOCUMENTS

| | | |
|---|---|---|
| CN | 103118087 A | 5/2013 |
| CN | 103391367 A | 11/2013 |

* cited by examiner

METHOD AND APPARATUS FOR REMOTELY DELETING INFORMATION

The present application is a continuation of International Patent Application No. PCT/CN2016/081405 filled on May 9, 2016, which claims the priority to Chinese Patent Disclosure No. 201510306263.X, titled "METHOD AND APPARATUS FOR REMOTELY DELETING INFORMATION", filed on Jun. 5, 2015 with the State Intellectual Property Office of the People's Republic of China, both of which are incorporated herein by reference in their entireties.

TECHNICAL FIELD

The present disclosure relates to the field of communications, and in particular to a method and an apparatus for remotely deleting information.

BACKGROUND

With the popularity of mobile terminals, more and more users use mobile terminals, and more and more information is stored in the mobile terminals. At present, in order to improve the security of information in the mobile terminals and prevent the information from being leaked when the mobile terminals are stolen or lost, some applications are developed to provide an anti-unloading protection function. When a mobile terminal that enables the anti-unloading protection function is lost, the user may send, using another device, an instruction to the lost mobile terminal through a server, to delete data in the mobile terminal, so that the security of the user data is ensured.

However, the data deleted by the above method is only data in a secure digital memory card (shorted as SD) in the mobile terminal, other private data in the mobile terminal, such as mailbox data, call records and WeChat records, cannot be deleted, still resulting in security risks.

SUMMARY

In view of the above, a method and an apparatus for remotely deleting information are provided according to embodiments of the present disclosure, to remotely delete all data in a terminal. The technical solutions are described as follows.

In an aspect, a method for remotely deleting information is provided, which includes:

acquiring permission for remotely deleting all information when a user logs in to a terminal and requests to enable a remote deletion function;

receiving an all information deletion command sent by a server after the user performs remote login; and performing an operation of deleting all information in the terminal in response to the command and based on the permission.

The receiving an all information deletion command sent by a server after the user performs remote login may include:

receiving the all information deletion command sent by the server in a form of a network message or a short message after the user performs remote login.

The method may further include:

storing account information of the user and terminal information when the user logs in to the terminal and requests to enable the remote deletion function.

The performing an operation of deleting all information in the terminal in response to the command and based on the permission may include:

performing verification on account information and terminal information carried in the command based on the stored account information of the user and the stored terminal information; and performing the operation of deleting all information in the terminal based on the permission in a case that the verification is successful.

The method may further include:

performing an operation of deleting a part of information in the terminal, in a case that the operation of deleting all information in the terminal is failed.

In another aspect, a method for remotely deleting information is provided, which includes:

receiving a request to remotely delete all information in a terminal after a user performs remote login; and sending an all information deletion command to the terminal to trigger the terminal to delete all information in the terminal.

The sending an all information deletion command to the terminal may include:

sending the all information deletion command to the terminal in a form of a network message or a short message.

The method may further include:

acquiring account information of the user and terminal information when the user logs in to the terminal, and including the account information and the terminal information in the sent command.

In another aspect, an apparatus for remotely deleting information is provided, which includes:

an acquiring module, configured to acquire permission for remotely deleting all information when a user logs in to a terminal and requests to enable a remote deletion function;

a receiving module, configured to receive an all information deletion command sent by a server after the user performs remote login; and a deletion module, configured to perform an operation of deleting all information in the terminal in response to the command and based on the permission.

The receiving module may include:

a receiving unit, configured to receive the all information deletion command sent by the server in a form of a network message or a short message after the user performs remote login.

The apparatus may further include:

a storage module, configured to store account information of the user and terminal information when the user logs in to the terminal and requests to enable the remote deletion function.

The deletion module may include:

a verification unit, configured to perform verification on account information and terminal information carried in the command based on the stored account information of the user and the stored terminal information; and a deletion unit, configured to perform the operation of deleting all information in the terminal based on the permission in a case that the verification unit verifies successfully.

The deletion module may be further configured to:

perform an operation of deleting a part of information in the terminal, in a case that the operation of deleting all information in the terminal is failed.

In another aspect, an apparatus for remotely deleting information is provided, which includes:

a receiving module, configured to receive a request to remotely delete all information in a terminal after a user performs remote login; and a sending module, configured to send an all information deletion command to the terminal to trigger the terminal to delete all information in the terminal.

The sending module may include:

a sending unit, configured to send the all information deletion command to the terminal in a form of a network message or a short message to trigger the terminal to delete all information in the terminal.

The apparatus may further include:

an acquiring module, configured to acquire account information of the user and terminal information when the user logs in to the terminal, where the sending module is further configured to include the account information and the terminal information in the sent command.

The technical solution according to embodiments of the present disclosure has the following advantageous effect. When a user logs in to a terminal and requests to enable a remote deletion function, the permission for remotely deleting all information is acquired. After the user performs remote login, an all information deletion command sent by a server is received. In response to the command and based on the permission, an operation of deleting all information in the terminal is performed, thereby remotely deleting all information in the terminal, improving the ability of remote control, and preventing leakage of the information in the terminal. The technical solution solves the problem that when the terminal is lost or stolen, not all information in the terminal can be deleted remotely. In this way, the information in the terminal can be cleared completely, which enhances the security of information in the terminal.

BRIEF DESCRIPTION OF THE DRAWINGS

The accompany drawings needed to be used in the description of the embodiments or the conventional technology are described briefly as follows, so that the technical solutions according to the embodiments in the present disclosure or according to the conventional technology become clearer. It is obvious that the accompany drawings in the following description are only some embodiments of the present disclosure. For those skilled in the art, other accompany drawings may be obtained according to these accompanying drawings without any creative work.

DETAILED DESCRIPTION OF THE EMBODIMENTS

The technical solution according to embodiments of the present disclosure will be described in detail as follows in conjunction with the accompany drawings, so that the purpose, characteristics and advantages can be clearer.

Figure 1:
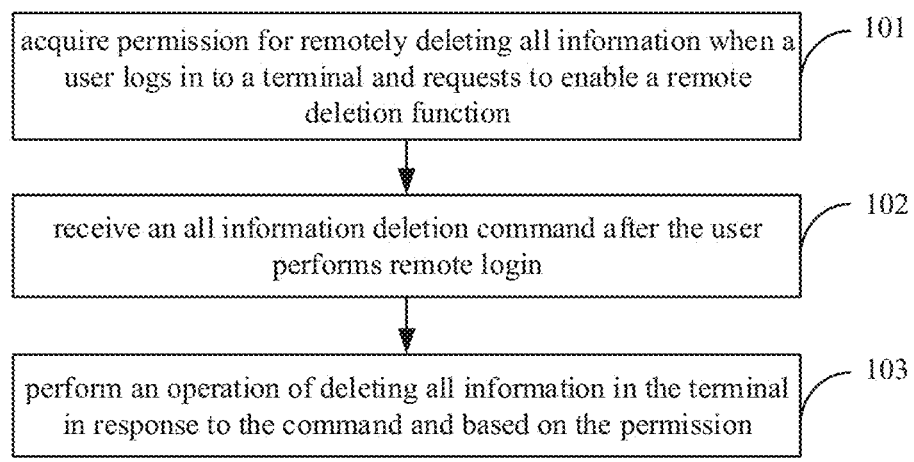
FIG. 1 is a flow chart of a method for remotely deleting information according to an embodiment of the present disclosure.

Referring to FIG. 1, a method for remotely deleting method is provided according to an embodiment of the present disclosure, which includes steps 101 to 103.

In step 101, when a user logs in to a terminal and requests to enable a remote deletion function, permission for remotely deleting all information is acquired.

The permission for remotely deleting all information may be uploaded to a server. The terminal may be a mobile phone, a tablet PC, etc., which is not limited herein.

In step 102, an all information deletion command, which is sent by a server after the user performs remote login, is received.

The user may remotely log in with a computer, a notebook computer, a tablet PC, or other mobile phone. The user may log in via a web page, or via an application of a computer, a notebook computer, a tablet PC, or other mobile phone.

In the embodiment, no matter whether logging in via the web page or the application, the user inputs account information, for the server to authenticate. The account information includes but is not limited to an account name and a password.

In step 103, an operation of deleting all information in the terminal is performed in response to the command and based on the permission.

The all information in the terminal not only includes information in a SD card in the terminal, but also includes information stored in storage of the terminal other than the SD card, such as Call records, mail content, WeChat records, etc.

In the embodiment, optionally, the step of receiving an all information deletion command sent by a server after the user performs remote login includes: receiving the all information deletion command sent by the server in a form of a network message or a short message after the user performs remote login.

In the embodiment, optionally, the above method further includes: storing account information of the user and terminal information when the user logs in to the terminal and requests to enable the remote deletion function.

The account information of the user and the terminal information may be uploaded to the server. In the embodiment, optionally, the step that an operation of deleting all information in the terminal in response to the command and based on the permission is performed includes: performing verification on account information and terminal information carried in the command based on the stored account information of the user and the stored terminal information; and performing the operation of deleting all information in the terminal based on the permission in a case that the verification is successful.

In the embodiment, optionally, the above method further includes: performing an operation of deleting a part of information in the terminal in a case that the operation of deleting all information in the terminal is failed.

In the above method according to the embodiment of the present disclosure, when the user logs in to the terminal and requests to enable the remote deletion function, the permission for remotely deleting all information is acquired. After the user performs remote login, the all information deletion command sent by the server is received. In response to the command and based on the permission, the operation of deleting all information in the terminal is performed, thereby remotely deleting all information in the terminal, improving the ability of remote control, and preventing leakage of the information in the terminal. The technical solution solves the problem that when the terminal is lost or stolen, all information in the terminal cannot be deleted remotely can be solved. In this way, the information in the terminal can be cleared completely, which enhances the security of information in the terminal.

Figure 2:
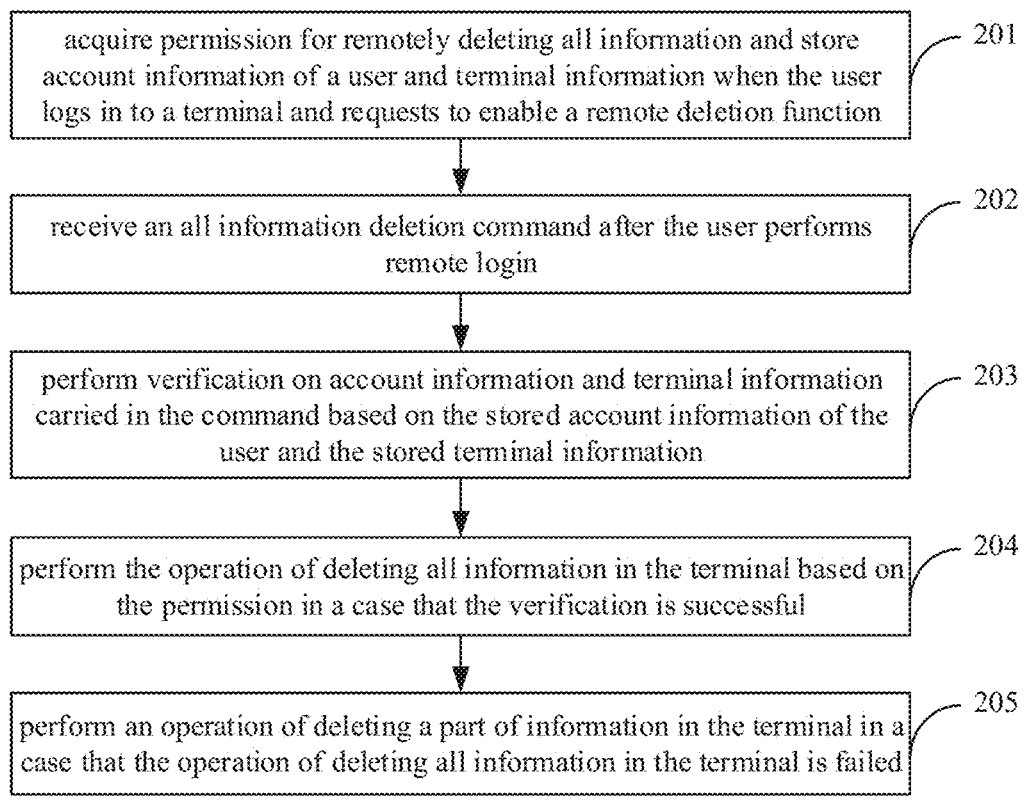
FIG. 2 is a flow chart of a method for remotely deleting information according to another embodiment of the present disclosure.

Referring to FIG. 2, a method for remotely deleting information according to another embodiment of the present disclosure is provided, which includes steps 201 to 205.

In step 201, when a user logs in to a terminal and requests to enable a remote deletion function, permission for remotely deleting all information is acquired, and account information of the user and terminal information are stored.

The account information of the user and the terminal information may be uploaded to a server.

Generally, the terminal may provide options of permission for deleting information to the user, so that the user may acquire the permission when applying. The deletion permission options provided by the terminal may be permission for deleting a part of information, or permission for deleting all information. For a terminal which only provides permission option for deleting a part of information, by no means can delete all information in the terminal. For a terminal which provide permission option for deleting all information, all information in the terminal can be deleted through a deletion command if the permission is acquired.

In step 202, an all information deletion command sent by the server after the user performs remote login is received.

In the embodiment, the command may carry account information of the user and terminal information, for the terminal to perform local security verification. In a case that the verification is successful, the deletion operation is performed, and in a case of a failed verification, the deletion operation is not performed, to avoid loss of information of the terminal caused by an accidental deletion.

Optionally, the step may include: receiving the all information deletion command sent by the server through the server after the user performs remote login; or receiving the all information deletion command sent by the server in a form of a short message after the user performs remote login.

In step 203, based on the stored account information of the user and the stored terminal information, verification is performed on account information and terminal information carried in the command.

Optionally, the step of performing verification on account information and terminal information carried in the command includes: determining whether the account information carried by the command is the same as the account information of the user stored locally, and determining whether the terminal information carried by the command is the same as terminal information stored locally. If both are the same, the verification is successful; otherwise, the verification is failed.

The terminal information is information that identifies the terminal, including but not limited to: the International Mobile Equipment Identity (IMEI), the International Mobile Subscriber Identification Number (IMSI), or a number of the Subscriber Identity Module (SIM).

In step 204, in a case that the verification is successful, the operation of deleting all information in the terminal is performed based on the permission.

In a case of a failed verification, no further operation is performed, and the method ends directly.

In step 205, in a case that the operation of deleting all information in the terminal is failed, an operation of deleting a part of information in the terminal is performed.

In the embodiment, the operation of deleting all information has higher priority than the operation of deleting a part of information. For the terminal, deleting all information is equivalent to resuming the terminal to default settings. A system interface wipeData may be employed to resume the terminal to default settings, i.e., clear all information in the terminal, including applications, photos, which is not explained in details herein.

If the terminal provides the permission for deleting all information, the operation of deleting all information can be performed successfully. If the terminal only provides the permission for deleting a part of information, the operation of deleting all information cannot be performed successfully.

When the operation of deleting all information is failed, the operation of deleting a part of information may be performed, to delete information of, for example, a SD card in the terminal, to achieve the purpose of deleting information.

In the above method according to the embodiment of the present disclosure, when the user logs in to the terminal and requests to enable the remote deletion function, the permission for remotely deleting all information is acquired. After the user performs remote login, the all information deletion command sent by the server is received. In response to the command and based on the permission, the operation of deleting all information in the terminal is performed, thereby remotely deleting all information in the terminal, improving the ability of remote control, and preventing the leakage of the information in the terminal. The technical solution solves the problem that, when the terminal is lost or stolen, not all information in the terminal can be deleted remotely. In this way, the information in the terminal can be cleared completely, which enhances the security of information in the terminal.

Figure 3:
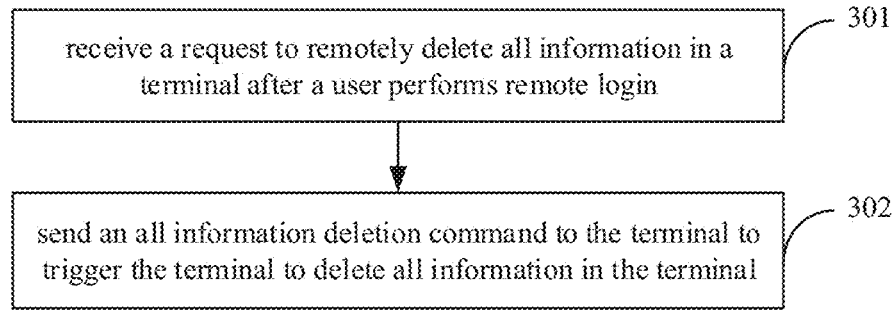
FIG. 3 is a flow chart of a method for remotely deleting information according to another embodiment of the present disclosure.

Referring to FIG. 3, a method for remotely deleting information is provided according to another embodiment of the present disclosure, which includes steps 301 to 302.

In step 301, after a user performs remote login, a request to remotely delete all information in a terminal is received.

In step 302, an all information deletion command is sent to the terminal to trigger the terminal to delete all information in the terminal.

In the embodiment, optionally, the step of sending an all information deletion command to the terminal includes: sending the all information deletion command to the terminal in a form of a network message or a short message.

In the embodiment, optionally, the above method further includes: acquiring account information of the user and terminal information when the user logs in to the terminal, and including the account information and the terminal information in the sent command.

In the above method according to the embodiment of the present disclosure, after the user performs remote login, the request to remotely delete all information is received. The all information deletion command is sent to the terminal to trigger the terminal to delete all information in the terminal, thereby remotely deleting all information in the terminal, improving the ability of remote control, and preventing the leakage of the information in the terminal. The technical solution solves the problem that when the terminal is lost or stolen, not all information in the terminal can be deleted remotely. In this way, the information in the terminal can be cleared completely, which enhances the security of information in the terminal.

Figure 4:
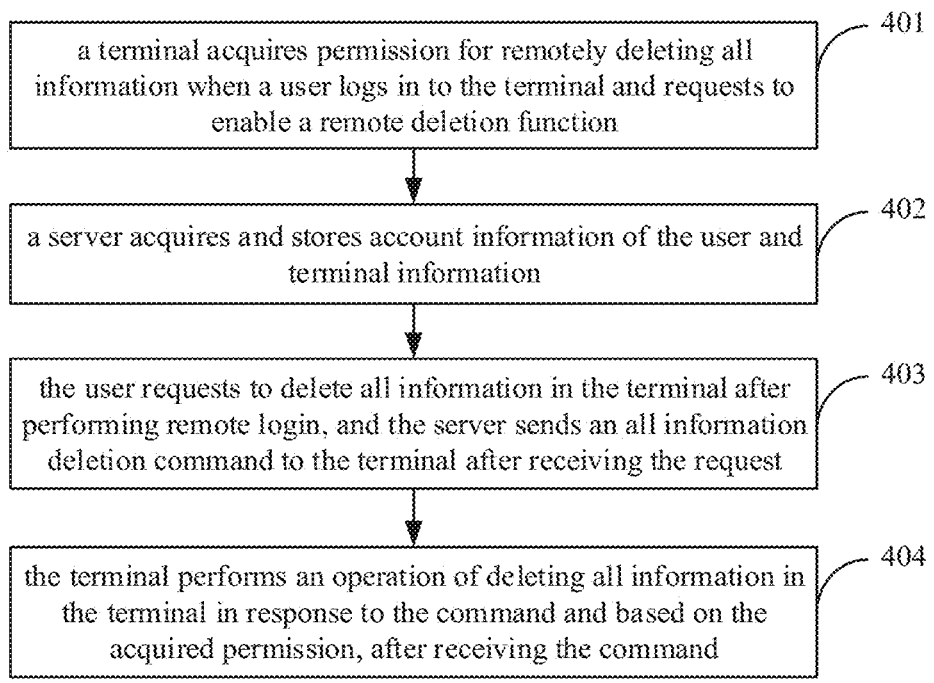
FIG. 4 is a flow chart of a method for remotely deleting information according to another embodiment of the present disclosure.

Referring to FIG. 4, a method for remotely deleting information is provided according to another embodiment of the present disclosure, which includes steps 401 to 404.

In step 401, when a user logs in to a terminal and requests to enable a remote deletion function, the terminal acquires permission for remotely deleting all information.

In step 402, a server acquires and stores account information of the user and terminal information.

In step 403, the user logs in remotely, and sends a request to delete all information in the terminal to the server. After receiving the request, the server sends an all information deletion command to the terminal.

In step 404, after receiving the command, the terminal performs an operation of deleting all information in the terminal in response to the command and based on the permission.

In the above method according to the embodiment of the present disclosure, when the user logs in to the terminal and requests to enable the remote deletion function, the terminal acquires the permission for remotely deleting all information. The server acquires and stores the account information of the user and the terminal information. After the user performs remote login, the server sends the all information deletion command to the terminal in responses to the request of the user. After receiving the command, the terminal performs the operation of deleting all information in the terminal in response to the command and based on the permission, thereby remotely deleting all information in the terminal, improving the ability of remote control, and preventing the leakage of the information in the terminal. the technical solution solves the problem that when the terminal is lost or stolen, not all information in the terminal can be deleted remotely. In this way, the information in the terminal can be cleared completely, which enhances the security of information in the terminal.

Figure 5:
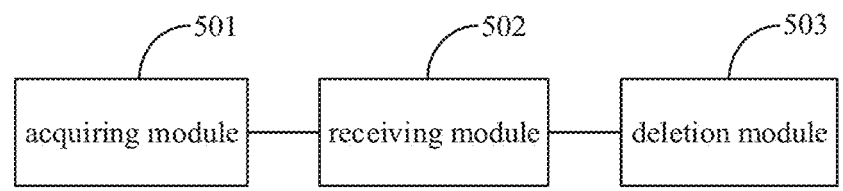
FIG. 5 is a schematic structural diagram of an apparatus for remotely deleting information according to another embodiment of the present disclosure.

Referring to FIG. 5, an apparatus for remotely deleting information is provided according to another embodiment of the present disclosure, which includes an acquiring module 501, a receiving module 502 and a deletion module 503.

The acquiring module 501 is configured to acquire permission for remotely deleting all information when a user logs in to a terminal and requests to enable a remote deletion function.

The receiving module 502 is configured to receive an all information deletion command sent by a server after the user performs remote login.

The deletion module 503 is configured to perform an operation of deleting all information in the terminal in response to the command and based on the permission.

In the embodiment, optionally, the receiving module includes a first receiving unit and a second receiving unit.

The first receiving unit is configured to receive the all information deletion command sent by the server through the server after the user performs remote login.

The second receiving unit is configured to receive the all information deletion command sent by the server in a form of a short message after the user performs remote login.

In the embodiment, optionally, the above apparatus further includes a storage module.

The storage module is configured to store account information of the user and terminal information when the user logs in to the terminal and requests to enable the remote deletion function.

In the embodiment, optionally, the deletion module includes a verification unit and a deletion unit.

The verification unit is configured to perform verification on account information and terminal information carried in the command based on the stored account information of the user and the stored terminal information.

The deletion unit is configured to perform the operation of deleting all information in the terminal based on the permission in a case that the verification unit verifies successfully.

In the embodiment, optionally, the deletion module is further configured to perform an operation of deleting a part of information in the terminal, in a case that the operation of deleting all information in the terminal is failed.

In the above apparatus according to the embodiment of the present disclosure, when the user logs in to the terminal and requests to enable the remote deletion function, the permission for remotely deleting all information is acquired. After the user performs remote login, the all information deletion command sent by the server is received. In response to the command and based on the permission, the operation of deleting all information in the terminal is performed, thereby remotely deleting all information in the terminal, improving the ability of remote control, and preventing the leakage of the information in the terminal. The technical solution solves the problem that when the terminal is lost or stolen, not all information in the terminal can be deleted remotely. In this way, the information in the terminal can be cleared completely, which enhances the security of information in the terminal.

Figure 6:
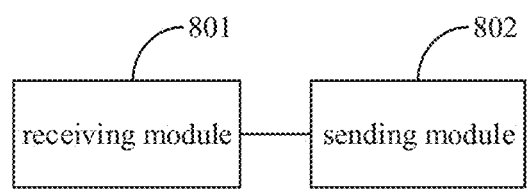
FIG. 6 is a schematic structural diagram of an apparatus for remotely deleting information according to another embodiment of the present disclosure.

Referring to FIG. 6, an apparatus for remotely deleting information is provided according to another embodiment, which includes a receiving module 801 and a sending module 802.

The receiving module 801 is configured to receive a request to remotely delete all information in a terminal after a user performs remote login.

The sending module 802 is configured to send an all information deletion command to the terminal to trigger the terminal to delete all information in the terminal.

In the embodiment, optionally, the sending module includes a sending unit.

The sending module is configured to send the all information deletion command to the terminal in a form of a network message or a short message to trigger the terminal to delete all information in the terminal.

In the embodiment, optionally, the apparatus further includes an acquiring module.

The acquiring module is configured to acquire account information of the user and terminal information when the user logs in to the terminal.

The sending module is further configured to include the account information and the terminal information in the sent command.

In the above apparatus according to the embodiment of the present disclosure, after the user performs remote login, the request to remotely delete the all information is received. The all information deletion command is sent to the terminal to trigger the terminal to delete all information in the terminal, thereby remotely deleting all information in the terminal, improving the ability of remote control, and preventing the leakage of the information in the terminal. The technical solution solves the problem that when the terminal is lost or stolen, not all information in the terminal can be deleted remotely. In this way, the information in the terminal can be cleared completely, which enhances the security of information in the terminal.

Figure 7:
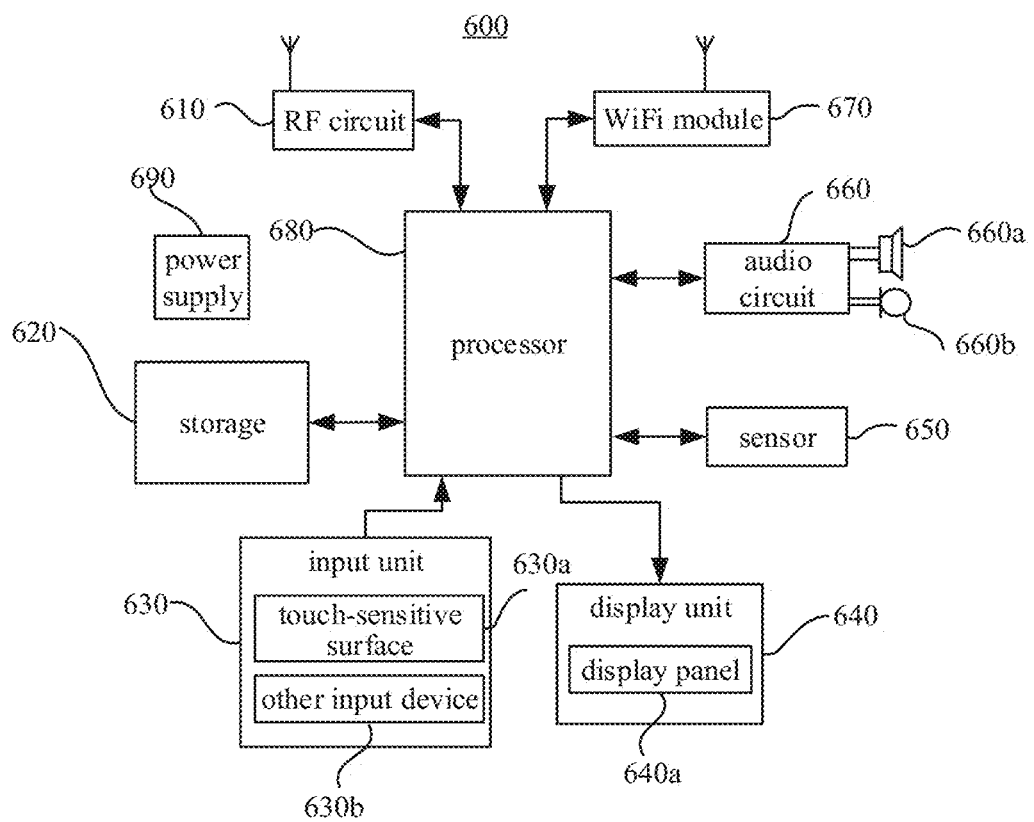
FIG. 7 is a schematic structural diagram of a terminal according to another embodiment of the present disclosure.

Referring to FIG. 7, a terminal 600 is provided according to another embodiment of the present disclosure, which may include a communication unit 610, a storage 620 which includes one or more non-volatile readable storage mediums, an input unit 630, a display unit 640, a sensor 650, an audio circuit 660, a WiFi (wireless fidelity) module 670, a processor 680 which includes one or more processing cores, and a power supply 690.

It can be understood by those skilled in the art that the terminal structure shown in FIG. 7 does not limit the terminal. The terminal may include more or fewer components than illustrated. Some of the components may be integrated, or may be arranged differently.

The communication unit 610 may be configured to receive and send information, or receive and send a signal during a call. The communication unit 610 may be a RF (Radio Frequency) circuit, a router, a modem, or other network communication devices. Specially, when the communication unit 610 is an RF circuit, the RF circuit delivers the downlink information received from a base station to one or more processors 680 for processing, and transmits related uplink data to the base station. Generally, the RF circuit, as a communication unit, includes but is not limited to an antenna, at least one amplifier, a tuner, one or more oscillators, a subscriber identity module (SIM) card, a transceiver, a coupler, an LNA (Low Noise Amplifier), and a duplexer. Furthermore, the communication unit 610 may also communicate with network and other devices by means of wireless communication. The wireless communication may be performed with any communication standards or protocols, which include but are not limited to GSM (Global System of Mobile communication), GPRS (General Packet Radio Service), CDMA (Code Division Multiple Access), WCDMA (Wideband Code Division Multiple Access), LTE (Long Term Evolution), E-mail, and SMS (Short Messaging Service). The storage 620 may be configured to store a software program and a module. The processor 680 performs various functional applications and data processing by executing the software program and the module stored in the storage 620. The storage 620 may mainly include a program storage region and a data storage region. The program storage region may store an operation system and an application program required by at least one function (such as, an audio play function, an image display function, etc.). The data storage region may store data (such as, audio data, a phone book, etc.) created in response to the use of the terminal 600. In addition, the storage 620 may include a high-speed random access memory, and may also include a non-volatile storage, such as at least one magnetic disk storage device and a flash storage device, or include other volatile solid state storage device. Accordingly, the storage 620 may also include a storage controller to control access to the storage 620 by the processor 680 and the input unit 630.

The input unit 630 may be configured to receive inputted numeric or character information and generate signals related to user settings and function control inputted with a keyboard, a mouse, an operating rod, an optical or a track ball. Optionally, the input unit 630 may include a touch-sensitive surface 630a and other input devices 630b. The touch-sensitive surface 630a, also referred to as a touch screen or a touch plate, may collect a touch operation performed by a user on or near the touch-sensitive surface 630a (such as, an operation performed on the touch-sensitive surface 630a or near the touch-sensitive surface 630a by the user using a finger, a stylus or any other suitable object or accessory), and drive a corresponding connection device based on a preset program. Optionally, the touch-sensitive surface 630a may include both a touch detection device and a touch controller. The touch detection device detects a touch position of the user, detects a signal generated from the touch operation, and sends the signal to the touch controller. The touch controller receives touch information from the touch detection device, converts the information into contact coordinates, sends the contact coordinates to the processor 680, and receives and executes a command sent by the processor 680. In addition, the touch-sensitive surface 630a may be implemented in multiple forms such as a resistive form, a capacitive form, an infrared form, and a surface acoustic wave form. In addition to the touch-sensitive surface 630a, the input unit 630 may also include other input devices 630b. Optionally, the other input devices 630b may include, but are not limited to, one or more of a physical keyboard, a functional key (such as, a volume control button, a switch button, etc.), a trackball, a mouse, and a joystick.

The display unit 640 may be configured to display information inputted by a user, information provided to the user, or various graphical user interfaces of the terminal 600. The graphical user interfaces may be constituted by graphics, texts, icons, videos and any combination thereof. The display unit 640 may include a display panel 640a. Optionally, the display panel 640a may be configured in a form of an LCD (Liquid Crystal Display), an OLED (Organic Light-Emitting Diode), or the like. Further, the touch-sensitive surface may cover the display panel 640a. After the touch-sensitive surface 630a detects a touch operation thereon or thereby, the touch operation is sent to the processor 680 to determine a touch event type. Then the processor 680 provides a corresponding visual output on the display panel 640a based on the touch event type. Although in FIG. 7, the touch-sensitive surface 630a and the display panel 640a are two separate components to perform the input and the input function, in some embodiments, the touch-sensitive surface 630a and the display panel 640a may be integrated to perform the input and output functions.

The terminal 600 may also include at least one sensor 650, such as a photo sensor, a motion sensor, and other sensors. Optionally, the optical sensor may include an ambient light sensor and a proximity sensor. With the ambient light sensor, a brightness of the display panel 640a may be adjusted based on an ambient light. With the proximity sensor, the display panel 640a and/or the backlight may be turned off when the terminal 600 moves to the ear. As a kind of motion sensor, a gravitational acceleration sensor may detect magnitude of accelerations in each direction (usually three axes). The gravitational acceleration sensor may detect magnitude and direction of gravity when the sensor is in the stationary state, which may be applied to an application requiring recognition of a mobile-phone gesture (such as, switch between vertical-screen and horizontal-screen, a related game, and magnetometer attitude calibration), and may be applied to an application relating to vibration recognition (e.g., a pedometer, beating recognition). The terminal 600 may be provided with a gyroscope, a barometer, a hygrometer, a thermometer, an infrared sensor and other sensors, which are not described herein.

The audio circuit 660, a speaker 660a, and a microphone 660b may provide an audio interface between the user and the terminal 600. The audio circuit 660 may transmit an electrical signal converted from the received audio data, to the speaker 660*a*. The electrical signal is converted into a voice signal and outputted by the speaker 660*a*. On the other hand, the microphone 660*b* converts the collected voice signal into an electrical signal, and the audio circuit 660 receives the electrical signal and converts the electrical signal into audio data. After being processed by an output processor 680, the audio data is sent to another terminal via the RF circuit 610, or the audio data is outputted to the storage 620 for further processing. The audio circuit 660 may also include an earphone jack to be used for communication between a peripheral headset and the terminal 600.

For wireless communication, the terminal may be configured with a wireless communication unit 670, which may be a WiFi module. The WiFi technology is a short-range wireless transmission technology. The terminal 600 may assist the user to send and receive an e-mail, browse a web page, and access a stream media through the wireless communication unit 670. The wireless communication unit 670 provides access to wireless broadband Internet for the user. Although the wireless communication unit 670 is shown in FIG. 7, it is understood that the wireless communication unit 670 is not a necessary unit for the terminal 600, and may be omitted as required without departing from the essence of the disclosure.

The processor 680 is a control center of the terminal 600, which is connected to various parts of the mobile phone through various interfaces and circuits. By running or executing a software program and/or a module stored in the storage 620, and calling data stored in the storage 620, the processor 680 executes various functions of the terminal 600 and processes data, to perform an overall monitoring of the mobile phone. Optionally, the processor 680 may include one or more processing cores. Preferably, an application processor and a modem processor may be integrated into the processor 680. The application processor mainly processes an operating system, a user interface, and an application program. The modem processor mainly processes wireless communication. It is to be understood that the above-described modem processor may not be integrated into the processor 680.

The terminal 600 may also include a power supply 690 (such as a battery) for supplying power to the various components. Preferably, the power supply may be logically connected to the processor 680 through a power supply management system, to perform functions such as charging, discharging, and power management through the power management system. The power supply 690 may also include one or more direct current or alternating current power supplies, a recharge system, a power failure detection circuit, a power converter or inverter, a power supply status indicator, and other components.

Although not shown, the terminal 600 may further include a camera, a Bluetooth module, etc., which is not described herein.

An optional structure of the terminal 600 is shown above with reference to FIG. 7. One or more modules are stored in the storage and executed by the one or more processors.

The one or more modules have the following functions:

acquiring permission for remotely deleting all information when a user logs in to a terminal and requests to enable a remote deletion function;

receiving an all information deletion command sent by a server after the user performs remote login; and performing an operation of deleting all information in the terminal in response to the command and based on the permission.

The receiving an all information deletion command sent by a server after the user performs remote login includes: receiving the all information deletion command sent by the server in a form of a network message or a short message after the user performs remote login.

The functions further include storing account information of the user and terminal information when the user logs in to the terminal and requests to enable the remote deletion function.

The performing an operation of deleting all information in the terminal in response to the command and based on the permission includes: performing verification on account information and terminal information carried in the command based on the stored account information of the user and the stored terminal information; and performing the operation of deleting all information in the terminal based on the permission in a case that the verification is successful.

The functions further include: performing an operation of deleting a part of information in the terminal in a case that the operation of deleting all information in the terminal is failed.

In the above terminal according to the embodiment of the present disclosure, when the user logs in to the terminal and requests to enable the remote deletion function, the permission for remotely deleting all information is acquired. After the user performs remote login, the all information deletion command sent by the server is received. In response to the command and based on the permission, the operation of deleting all information in the terminal is performed, thereby remotely deleting all information in the terminal, improving the ability of remote control, and preventing the leakage of the information in the terminal.

The technical solution solves the problem that when the terminal is lost or stolen, not all information in the terminal can be deleted remotely. In this way, the information in the terminal can be cleared completely, which enhances the security of information in the terminal.

Figure 8:
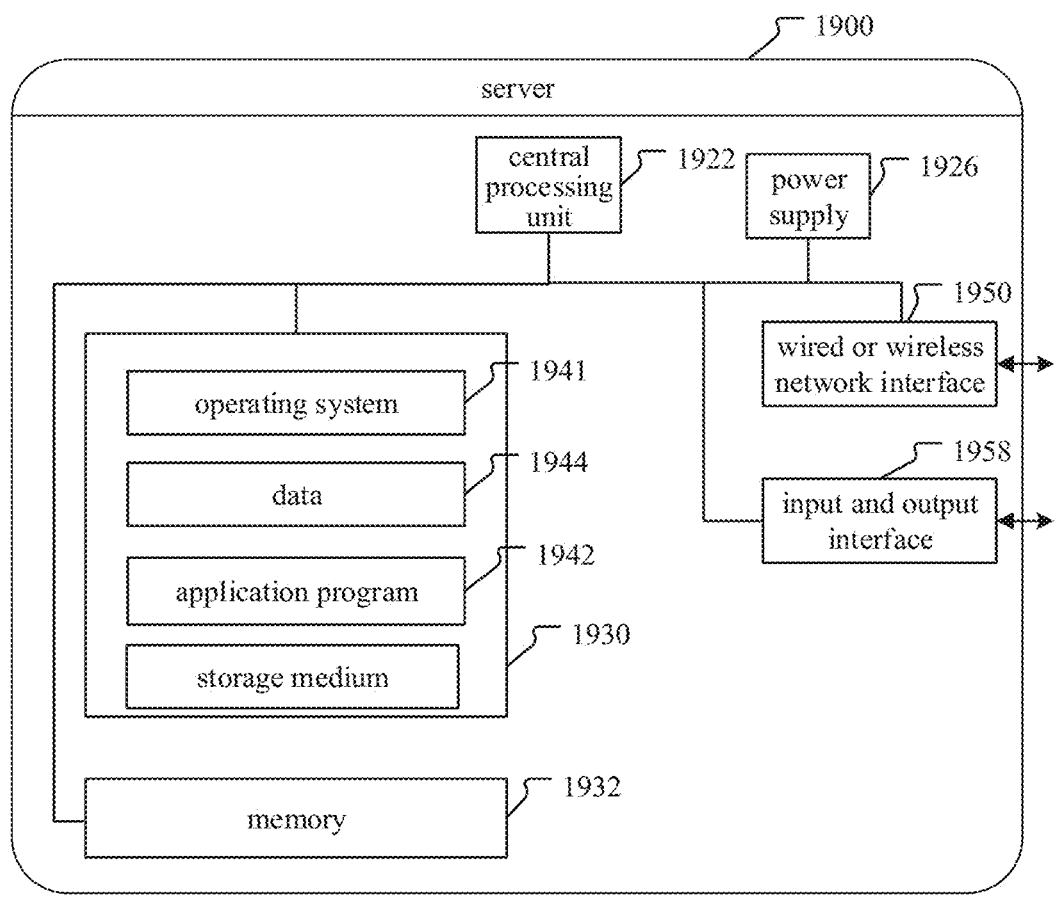
FIG. 8 is a schematic structural diagram of a server according to another embodiment of the present disclosure.

A server is provided according to another embodiment of the present disclosure. The server may be configured to execute the remote deletion methods provided in the above embodiments. Referring to FIG. 8, the server 1900 may have very different configurations or performances. The server may include one or more central processing units (CPU) 1922 (such as, one or more processors), a memory 1932, and one or more storage mediums 1930 (such as, one or more mass storage devices) which store an application program 1942 or data 1944. The memory 1932 and the storage medium 1930 may perform transient storage or persistent storage. The program stored in the storage medium 1930 may include one or more modules (not shown in FIG. 8). Each module may include a series of instructions operated in the server. Further, the CPU 1922 may be configured to communicate with the storage medium 1930, and execute a series of instructions in the storage medium 1930 on the server 1900.

The server 1900 may also include one or more power supplies 1926, one or more wired or wireless network interfaces 1950, one or more input-output interfaces 1958, and/or, one or more operating systems 1941, such as the Windows Server™, the Mac OS X™, the Unix™, the Linux™, the FreeBSD™.

In the embodiment, one or more programs configured to be executed by one or more processors include instructions for performing the following operations: receiving a request to remotely delete all information in a terminal after a user performs remote login; and sending an all information deletion command to the terminal to trigger the terminal to delete all information in the terminal.

The sending an all information deletion command to the terminal includes: sending the all information deletion command to the terminal in a form of a network message or a short message.

The operations further include: acquiring account information of the user and terminal information when the user logs in to the terminal, and including the account information and the terminal information in the sent command.

In the above server according to the embodiment of the present disclosure, after the user performs remote login, the request to remotely delete the all information is received. The all information deletion command is sent to the terminal to trigger the terminal is triggered to delete all information in the terminal, thereby remotely deleting all information in the terminal, improving the ability of remote control, and preventing the leakage of the information in the terminal. The technical solution solves the problem that when the terminal is lost or stolen, not all information in the terminal can be deleted remotely. In this way, the information in the terminal can be cleared completely, which enhances the security of information in the terminal.

A non-volatile readable storage medium is provided according to another embodiment of the present disclosure. One or more modules (programs) are stored in the storage medium. The one or more modules, when running in a device, control the device to execute the following instructions:

acquiring permission for remotely deleting all information when a user logs in to a terminal and requests to enable a remote deletion function;

receiving an all information deletion command sent by a server after the user performs remote login; and performing an operation of deleting all information in the terminal in response to the command and based on the permission.

The receiving an all information deletion command sent by a server after the user performs remote login includes: receiving the all information deletion command sent by the server in a form of a network message or a short message after the user performs remote login.

The instructions further include: storing account information of the user and terminal information when the user logs in to the terminal and requests to enable the remote deletion function.

The performing an operation of deleting all information in the terminal in response to the command and based on the permission includes: performing verification on account information and terminal information carried in the command based on the stored account information of the user and the stored terminal information; and performing the operation of deleting all information in the terminal based on the permission in a case that the verification is successful.

The instructions further include: performing an operation of deleting a part of information in the terminal in a case that the operation of deleting all information in the terminal is failed.

In the above non-volatile readable storage medium according to the embodiment of the present disclosure, when the user logs in to the terminal and requests to enable the remote deletion function, the permission for remotely deleting all information is acquired. After the user performs remote login, the all information deletion command sent by the server is received. In response to the command and based on the permission, the operation of deleting all information in the terminal is performed, thereby remotely deleting all information in the terminal, improving the ability of remote control, and preventing the leakage of the information in the terminal. The technical solution solves the problem that when the terminal is lost or stolen, not all information in the terminal can be deleted remotely. In this way, the information in the terminal can be cleared completely, which enhances the security of information in the terminal.

A non-volatile readable storage medium is provided according to another embodiment of the present disclosure. One or more modules (programs) are stored in the storage medium. The one or more modules, when running in a device, control the device to execute the following instructions:

receiving a request to remotely delete all information in a terminal after a user performs remote login; and sending an all information deletion command to the terminal to trigger the terminal to delete all information in the terminal.

The sending an all information deletion command to the terminal includes: sending the all information deletion command to the terminal in a form of a network message or a short message.

The instructions further include: acquiring account information of the user and terminal information when the user logs in to the terminal, and including the account information and the terminal information in the sent command.

In the above non-volatile readable storage medium according to the embodiment of the present disclosure, after the user performs remote login, the request to remotely delete the all information is received. The all information deletion command is sent to the terminal to trigger the terminal is triggered to delete all information in the terminal, thereby remotely deleting all information in the terminal, improving the ability of remote control, and preventing the leakage of the information in the terminal. The technical solution solves the problem that when the terminal is lost or stolen, not all information in the terminal can be deleted remotely. In this way, the information in the terminal can be cleared completely, which enhances the security of information in the terminal.

It can be understood by those skilled in the art that all or some of steps according to the above embodiments may be implemented by hardware, and also may be implemented by a program instructing hardware. The program may be stored in a non-volatile readable storage medium, which may be a read-only memory, a magnetic disk or an optical disk.

The above only describes preferred embodiments, and is not intended to limit the disclosure. Any modifications, equivalent replacements and variations made in the spirit and principle of the disclosure shall be included in the scope of protection of the disclosure.

The invention claimed is:

1. A method for remotely deleting information, comprising:
   storing account information of a user and terminal information of a terminal locally at the terminal, the account information of the user including an account number and a password;
   acquiring permission for remotely deleting all information in the terminal when the user logs in to the terminal remotely via a server and requests to enable a remote deletion function;
   uploading the account information of the user and the terminal information of the terminal to the server;
   receiving a command for deleting all information sent by the server after the user logs in remotely, the command including the account information of the user;

determining that the account information as included in the command matches the account information and the terminal information stored at the terminal;

determining on whether the command for deleting all information in the terminal has failed based on system permission provided by the terminal;

in response to determining that the command for deleting all information has failed, initiating deleting a portion of information but not all information in the terminal, wherein the terminal is not resumed to factory settings; and in response to determining that the terminal provides the system permission to delete all information and the command for deleting all information in the terminal is successful, initiating deleting all information in the terminal, wherein all information in the terminal includes applications, photos and application data stored in storage of the terminal and information stored in an external SD card in response to the command and based on the permission, such that the terminal is resumed to factory settings;

wherein the method is performed by a processor.

2. The method according to claim 1, wherein receiving the command for deleting all information sent by the server after the user logs in the remote terminal remotely comprises:

receiving the command for deleting all information sent by the server in a form of a network message or a short message after the user logs in remotely.

3. The method according to claim 1, wherein the terminal information includes one or both of an International Mobile Equipment Identity (IMEI) and an International Mobile Subscriber Identification Number (IMSI).

4. An apparatus for remotely deleting information comprising one or more processors and a memory for storing program instructions, wherein the one or more processors is configured to execute the program instructions to:

store account information of a user and terminal information of a terminal locally at the terminal, the account information of the user including an account number and a password;

acquire permission for remotely deleting all information in the terminal when the user logs in to the terminal remotely via a server and requests to enable a remote deletion function;

upload the account information of the user and the terminal information of the terminal to the server;

receive a command for deleting all information sent by the server after the user logs in remotely, the command including the account information of the user;

determine that the account information as included in the command matches the account information and the terminal information stored at the terminal;

determine on whether the command for deleting all information in the terminal has failed based on system permission provided by the terminal;

in response to determining that the command for deleting all information has failed, initiate deleting a portion of information but not all information in the terminal, wherein the terminal is not resumed to factory settings; and in response to determining that the terminal provides the system permission to delete all information and the command for deleting all information in the terminal is successful, initiate deleting all information in the terminal, wherein all information in the terminal includes applications, photos and application data stored in storage of the terminal and information stored in an external SD card in response to the command and based on the permission, such that the terminal is resumed to factory settings.

5. The apparatus according to claim 4, wherein the one or more processors is further configured to execute the program instructions to:

receive the command for deleting all information sent by the server in a form of a network message or a short message after the user logs in remotely.

6. The apparatus according to claim 4, wherein the terminal information includes one or both of an International Mobile Equipment Identity (IMEI) and an International Mobile Subscriber Identification Number (IMSI).

7. A non-transitory computer readable storage medium comprising program instructions that, when executed by a processor of a computing device, cause the processor to:

store account information of a user and terminal information of a terminal locally at the terminal, the account information including an account number and a password;

acquire permission for remotely deleting all information in the terminal when the user logs in to the terminal remotely via a server and requests to enable a remote deletion function;

upload the account information of the user and the terminal information of the terminal to the server;

receive a command for deleting all information sent by the server after the user logs in remotely, the command including the account information of the user;

determining that the account information as included in the command matches the account information and the terminal information stored at the terminal;

determining on whether the command for deleting all information in the terminal has failed based on system permission provided by the terminal;

in response to determining that the command for deleting all information has failed, initiating deleting a portion of information but not all information in the terminal, wherein the terminal is not resumed to factory settings; and in response to determining that the terminal provides the system permission to delete all information and the command for deleting all information in the terminal is successful, initiating deleting all information in the terminal, wherein all information in the terminal includes applications, photos and application data stored in storage of the terminal and information stored in an external SD card in response to the command and based on the permission, such that the terminal is resumed to factory settings.

8. The computer readable storage medium according to claim 7, wherein the instructions further cause the processor to:

receive the command for deleting all information sent by the server in a form of a network message or a short message after the user logs in remotely.

9. The computer readable storage medium according to claim 7, wherein the terminal information includes one or both of an International Mobile Equipment Identity (IMEI) and an International Mobile Subscriber Identification Number (IMSI).

* * * * *